United States Patent [19]

Mizuguchi et al.

[11] Patent Number: 5,895,617
[45] Date of Patent: Apr. 20, 1999

[54] METHOD AND APPARATUS FOR TRANSPORTING UNDERWATER CUT PELLETS

[75] Inventors: Hideki Mizuguchi; Masaharu Ishida. both of Hiroshima, Japan

[73] Assignee: The Japan Steel Works, Ltd., Tokyo, Japan

[21] Appl. No.: 08/903,727

[22] Filed: Jul. 31, 1997

[30] Foreign Application Priority Data

Jul. 31, 1996 [JP] Japan ................. 8-202203

[51] Int. Cl.$^6$ ............................................. B29B 9/06
[52] U.S. Cl. ............ 264/141; 264/142; 264/211.13; 264/234; 264/237; 425/67; 425/202; 425/311; 425/313; 425/378.1; 425/404
[58] Field of Search ................................. 264/141, 142, 264/211.13, 234, 237; 425/67, 202, 311, 313, 378.1, 404

[56] References Cited

U.S. PATENT DOCUMENTS 4,606,873 8/1986 Biglione et al. ................. 264/142 X
5,041,251 8/1991 McCoskey et al. .............. 264/141 X

FOREIGN PATENT DOCUMENTS 58-38117 3/1983 Japan ................................ 264/142
1-288408 11/1989 Japan ................................ 264/142

Primary Examiner—Leo B. Tentoni
Attorney, Agent, or Firm—Sughrue, Mion, Zinn, Macpeak & Seas, PLLC

[57] ABSTRACT

In the underwater cut pellet transport apparatus in which pellets cut formed by an underwater cutting device 4 are delivered to a cooling water dehydrating device 10 and a drying device 11 by means of the head pressure of a cooling water circulating pump 6 and are dehydrated and dried there, and the thus dried pellets are then delivered to pellet silos 15 by means of the head pressure of an air feed blower 17 of a pneumatic feed facility, the above-mentioned cooling water dehydrating device 10 and drying device 11 are respectively disposed above the pellet silos 15, thereby eliminating the need for provision of the above-mentioned pneumatic feed facility.

5 Claims, 2 Drawing Sheets

METHOD AND APPARATUS FOR TRANSPORTING UNDERWATER CUT PELLETS

BACKGROUND OF THE INVENTION

1. Field of the Invention

The present invention relates to method and apparatus for transporting underwater cut pellets and, in particular, to method and apparatus in which underwater cut pellets of synthetic resin, which have been formed by extruding the synthetic resin into the water through a die from a kneading and extruding machine or the like and then by cutting the same in the water, are carried by the water, and are then dehydrated and dried.

2. Related art

Conventionally, as underwater cut pellet transport apparatus, generally, there is employed underwater cut pellet transport apparatus which is structured in such a manner as shown in FIG. 2.

As shown in FIG. 2, synthetic resin material, which is supplied to a kneading and extruding machine 2 through a hopper 2a or the like, is melted and kneaded by a screw 2b which can be rotated by an extruding machine drive motor 1, is extruded in a strand form into the water through a granulating extrusion die 3 disposed in the leading end of the kneading and extruding machine 2, and is cut into pellets by an underwater cutting knife 4a which can be rotated on the surface of the extrusion die 3 by an underwater cutting knife drive motor 5 provided in an underwater cutting device 4.

The underwater cut pellets are cooled by the water that is fed from a cooling water tank 7 to the underwater cutting device 4 with a head pressure of 3–5 kg/cm$^2$ by a cooling water circulating pump 6, and are then delivered to a cooling water dehydrating device 10 through a cooling water circulating pipe 8 having a cooling water switching three-way valve 9. In the cooling water dehydrating device 10, the water and pellets are separated from each other, the pellets are next carried to a drying device 11 where the water attached to the pellets is removed from the pellets, and the pellets are then delivered to a transport hopper 16 through a classifier 12. By the way, an exhaust fan 20 is connected to the upper portion of the drying device 11 or the like.

The pellets delivered to the transport hopper 16 are then fed to a plurality of pellet silos through an air feed pipe 19 having a silo switching valve 14 due to the head pressure of an air feed blower 17 having an air filter 18.

By the way, the pellets stored within the pellet silos 15 are discharged from the lower portions of the pellet silos 15, are put into bags, and are then shipped as products.

The water separated from the pellets in the cooling water dehydrating device 10, the attached water removed from the pellets by the drying device 11, and the water diverged by switching the cooling water switching three-way valve 9 are respectively collected into the cooling water tank 7 and, after then, as described above, the thus collected water is fed to the underwater cutting device 4 by the cooling water circulating pump 6, thereby carrying out a continuous automatic water circulatory operation.

Since the conventional underwater cut pellet transport apparatus is structured in the above-mentioned manner, there have been found in the same apparatus several problems as follows: That is, (a) Because the conventional underwater cut pellet transport apparatus is composed of many devices, the apparatus itself is complicated in structure, which causes an increase in the cost of construction of such plant, that is, underwater cut pellet transport apparatus.

(b) While the conventional underwater cut pellet transport apparatus is divided into a pellet water cooling and drying line and a pneumatic feeding line in which dry pellets are fed to pellet silos by means of air pressure, these lines produce large noises which have ill effects on an operation environment.

(c) The pellets are rubbed against the inner wall of the pipe of the pneumatic feeding line to thereby produce film-like resin shavings, while the resin shavings are mixed into the product pellets.

SUMMARY OF THE INVENTION

Figure 1:
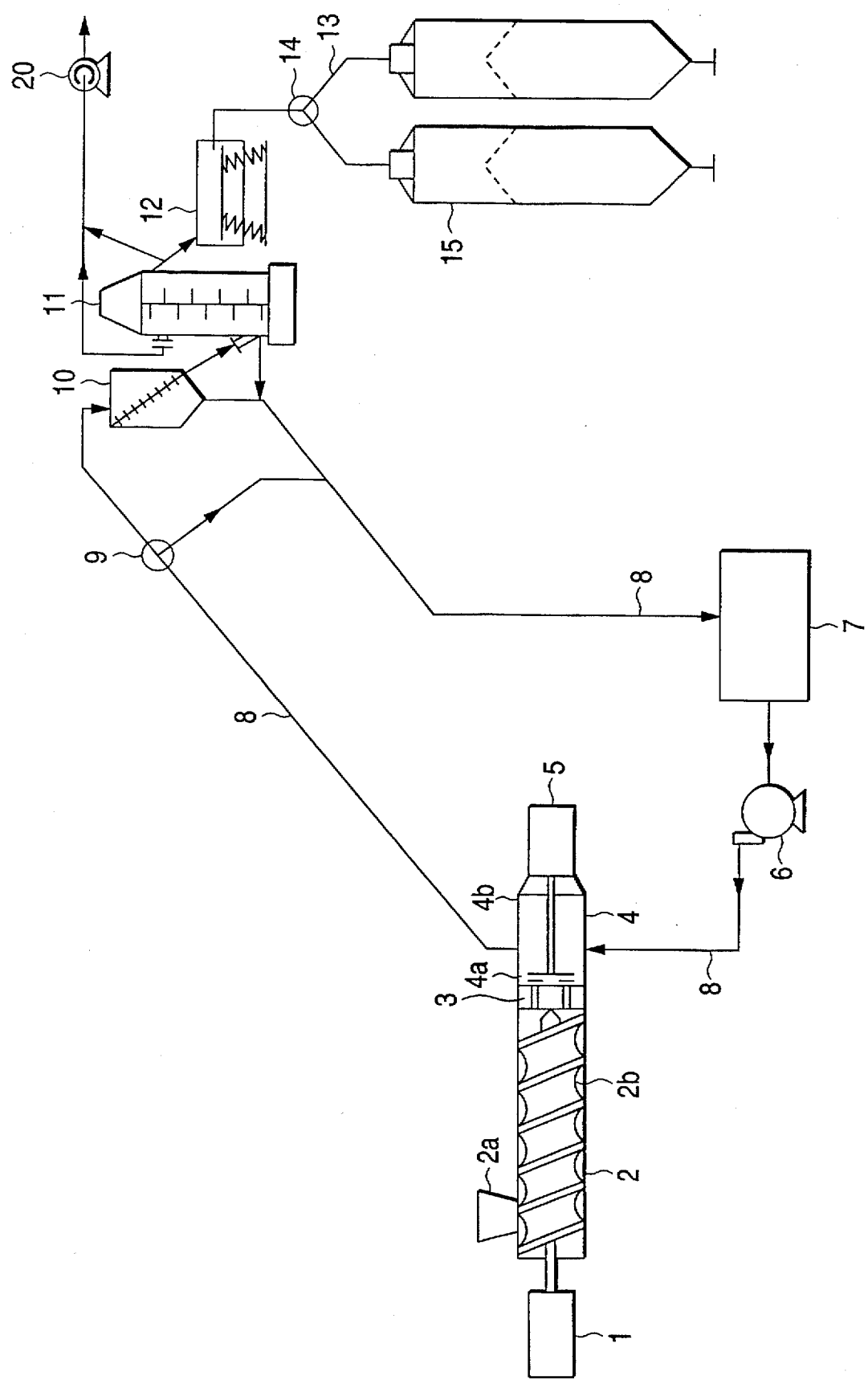
FIG. 1 is a structure view of the whole of underwater cut pellet transport apparatus according to the invention.
Figure 2:
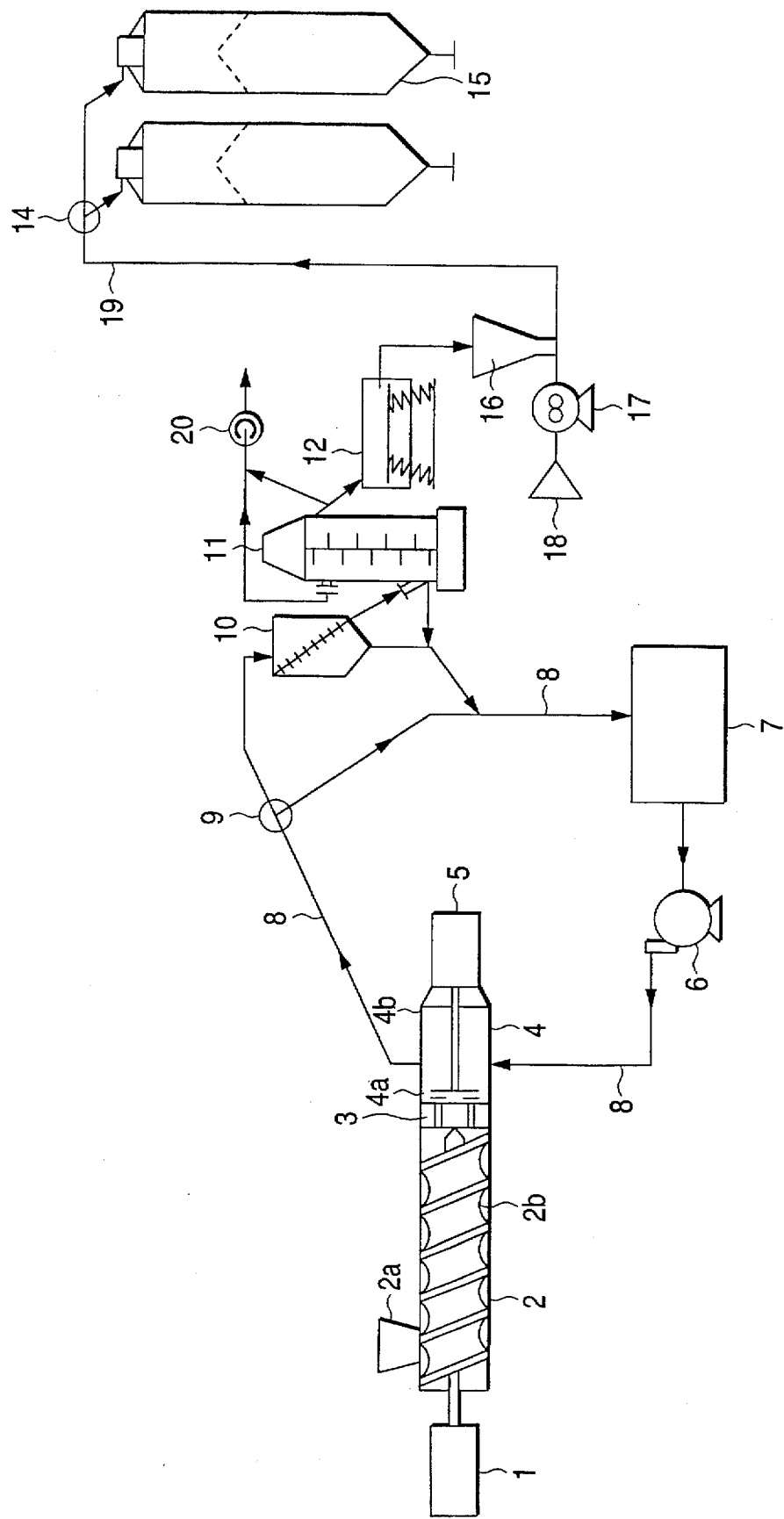
FIG. 2 is a structure view of the whole of underwater cut pellet transport apparatus according to the prior art.

The present invention aims at eliminating the above-mentioned problems found in the conventional underwater cut pellet transport apparatus. Accordingly, it is an object of the invention to provide underwater cut pellet transport method and apparatus in which a plant, that is, underwater cut pellet transport apparatus can be constructed at low costs, an operation environment is free from noises, and no resin shavings are produced during transport.

The present invention has solved the above-mentioned problems in the following manner. That is, according to the invention, there is provided an underwater cut pellet transport apparatus, in which a cooling water dehydrating device and a drying device are disposed above pellet silos so that dry pellets are allowed to fall down naturally or due to their own weights and to be stored into the pellet silos, thereby eliminating the need for provision of the conventional dry pellet pneumatic feed line.

DETAILED DESCRIPTION OF THE PREFERRED EMBODIMENTS

According to the invention, there is provided an underwater cut pellet transport method, in which pellets cut formed by an underwater cutting device are delivered to a cooling water dehydrating device and a drying device by means of the head pressure of a cooling water circulating pump and are dehydrated and dried there, the thus dried pellets are then delivered to a plurality of pellet silos by means of the head pressure of an air feed blower provided in a pneumatic feed facility, wherein the cooling water dehydrating device and drying device are respectively disposed above the pellet silos to thereby eliminate the need for provision of the pneumatic feed facility.

Also, according to the present invention, the dry pellets from the drying device are supplied to the pellet silos in such a manner that they are allowed to fall down into said pellet silos naturally, that is, due to their own weights.

Further, according to the present invention, the head pressure of the cooling water circulating pump is set in the range of 3–15 kg/cm$^2$.

According to the invention, there is provided underwater cut pellet transport apparatus, in which pellets cut formed by an underwater cutting device are delivered to a cooling water dehydrating device and a drying device by means of the head pressure of a cooling water circulating pump and are dehydrated and dried there, the thus dried pellets are then delivered to a plurality of pellet silos by means of the head pressure of an air feed blower provided in a pneumatic feed facility, wherein the cooling water dehydrating device and drying device are respectively disposed above the pellet silos to thereby eliminate the need for provision of the pneumatic feed facility, and also in that the dry pellets from the drying device are supplied through a chute pipe to the pellet silos in such a manner that they are allowed to fall down into the pellet silos naturally, that is, due to their own weights.

Embodiment

Now, description will be given below of an embodiment of underwater cut pellet transport apparatus according to the invention with reference to the accompanying drawing. In the present embodiment, the same or equivalent parts thereof to the above-mentioned conventional underwater cut pellet transport apparatus are given the same designations when they are described below.

Here, FIG. 1 is a structure view of the whole of underwater cut pellet transport apparatus according to the invention.

In FIG. 1, reference character 2 designates a kneading and extruding machine which can be rotated by a extruding machine drive motor 1 and includes a screw 2b formed in the interior thereof. To the leading end portion of the kneading and extruding machine 2, there is connected an underwater cutting device 4 through a granulating extrusion die 3. Also, the kneading and extruding machine 2 further includes, on the upper surface of the rear portion thereof, a hopper 2a which is used to supply synthetic resin.

The underwater cutting device 4 is mainly composed of a circulating box 4b which is connected to the granulating extrusion die 3 and is used to circulate water, and an underwater cutting knife 4a which is provided within the circulating box 4b and can be rotated on the surface of the die 3 by an underwater cutting knife drive motor 5.

A cooling water circulating pump 6 having a high head pressure (3–15 kg/cm$^2$) is connected through a cooling water circulating pipe 8 to the lower portion of the circulating box 4b of the underwater cutting device 4. Also, a cooling water dehydrating device 10, which is situated above pellet silos 15, is connected to the upper portion of the circulating box 4b through a cooling water circulating pipe 8 having a cooling water switching three-way valve 9. To the cooling water dehydrating device 10, there is connected a drying device 11 which is similarly disposed above the pellet silos 15 and, to the drying device 11, there is connected a classifier 12 which is similarly disposed above the pellet silos 15. The classifier 12 is connected to a plurality of silos 15 through a plurality of chute pipes 13 each having a silo switching valve 14. By the way, a pellet bagging device or the like is provided in the lower portion of each of the pellet silos 15, while an exhaust fan 20 is connected to the upper portion of the drying device 11 or the like.

One part of the cooling water switching valve 9 as well as the respective lower portions of the cooling water dehydrating device 10 and drying device 11 are connected to a cooling water tank 7 through the cooling water circulating pipe 8, while the cooling water tank 7 is connected to the cooling water circulating pump 6 through the cooling water circulating pipe 8.

Next, description will be given below of the operation of the present embodiment.

As shown in FIG. 1, the synthetic resin material, which is supplied to the kneading and extruding machine 2 through the hopper 2a, is fused and kneaded by the screw 2b that is rotated by the extruding machine drive motor 5, is next pushed in a strand from into the water through the granulating extrusion die 4a that is provided on the leading end of the kneading and extruding machine 2, and is then cut into pellets by the underwater cutting knife 4a that can be rotated on the surface of the die 4a by the underwater cutting knife drive motor 5 of the underwater cutting device 4.

The present underwater cut pellets are cooled by the water having a head pressure of 3–15 kg/cm$^2$ that is fed from the cooling water tank 7 to the underwater cutting device 4 by the cooling water circulating pump 6, and are then delivered to the cooling water dehydrating device 10, which is situated above the pellet silos 15, through the cooling water circulating pipe 8 having the cooling water switching three-way valve 9. In the cooling water dehydrating device 10, the water and pellets are separated from each other, the pellets are dried by the drying device 11 so that the attached water to the pellets is removed therefrom, and the dry pellets are allowed to fall down through the classifier 12 naturally or due to their own weights so that the dry pellets are delivered to the plurality of pellet silos 15 through the chute pipes 13 each having the silo switching valve 14. By the way, the pellets stored within the pellet silos 15 are then discharged from the lower portions of the pellet silos 15, are put into bags, and are shipped as products.

The water separated from the pellets in the cooling water dehydrating device 10, the attached water removed from the pellets by the drying device 11, and the water diverged by switching the cooling water switching three-way valve 9 are all collected into the cooling water tank 8 and, as described above, the thus collected water is then delivered to the underwater cutting device 4 by the cooling water circulating pump 6, thereby being able to realize an operation to circulate the water automatically and continuously.

The water to be delivered to the underwater cutting device may include warm water as well. Also, the synthetic resin may be pushed out by a gear pump through a die instead of the kneading and extruding machine.

Further, although the selector is used in the above-mentioned embodiment, if the cutting performance of the underwater cutting device is improved, then it is not always necessary to provide the selector.

For reference, when the operation of the present underwater cut pellet transport apparatus was carried out under the following conditions that the cooling water dehydrating device 10 and drying device 11 were arranged above the pellet silos 15 each having a height of about 50 m and the head pressure of the cooling water circulating pump 6 was set for 15 kg/cm$^2$ in consideration of not only the height but also a horizontal distance between them, there could be obtained good results.

According to the invention, due to the above-mentioned structure, there can be provided the following effects: that is, (a) since the pellets cut formed by the underwater cutting device are delivered together with the water to the cooling water dehydrating device situated above the pellet silos by the cooling water circulating device having a high pressure, there is eliminated the need for provision of all of a transport hopper, an air feed blower, a pneumatic air filter, an air feed pipe, and other attachments, which form a conventional pellet pneumatic feed facility;

(b) conventionally, the level of the noise generated from around the cooling water dehydrating device, drying device and selector was in the range of 95–110 dbA, whereas, according to the invention, because these devices are moved to and situated at high positions, the operation environment is free from the noise generated by these devices;

(c) conventionally, the level of the noise generated by the pellets when they are discharged from the pneumatic feed facility and air feed pipe was in the range of 90–105 dbA, whereas, according to the invention, since such facility and pipe are omitted, such noise was avoided;

(d) conventionally, the underwater cut pellet transport apparatus was divided into a pellet cooling water drying line and a pneumatic feed line for feeding dry pellets to pellet silos by means of air pressure, whereas, according to the invention, because the latter line is omitted, the construction cost of the present underwater cut pellet transport apparatus can be reduced about 40% over the conventional underwater cut pellet transport apparatus; and, (e) according to the invention, since the pellets cut formed by the underwater cutting device are delivered by means of water transport, there is no possibility that the pellets can be rubbed against the inner wall of the cooling water circulating pipe to thereby produce film-like resin shavings.

What is claimed is:

1. Underwater cut pellet transport apparatus comprising:

an underwater cutting device forming pellets;

a cooling water circulating pump delivering said pellets to a cooling water dehydrating device and a drying device by the head pressure of said cooling water circulating pump to dehydrate and dry there, a plurality of pellet silos to which the dried pellets are delivered, said cooling water dehydrating device and drying device disposed above said pellet silos; and a chute pipe supplying dry pellets from said drying device to said pellet silos in such a manner that they are allowed to fall down into said pellet silos naturally due to their own weights.

2. A underwater cut pellet transport apparatus as set forth in claim 1, wherein the head pressure of said cooling water circulating pump is set in the range of 3–15 kg/cm$^2$.

3. Method for transporting underwater cut pellet comprising the steps of:

forming pellets by an underwater cutting device;

delivering said pellets to a cooling water dehydrating device and a drying device through a cooling water circulating pump by the head pressure of said cooling water circulating pump to dehydrate and dry there, delivering the dried pellets to a plurality of pellet silos, said cooling water dehydrating device and drying device disposed above said pellet silos.

4. Method for transporting underwater cut pellet as claimed in claim 3, wherein said dry pellets from said drying device are supplied to said pellet silos in such a manner that they are allowed to fall down into said pellet silos due to their own weights.

5. A underwater cut pellet transport method as set forth in claim 3, wherein the head pressure of said cooling water circulating pump is set in the range of 3–15 kg/cm$^2$.

* * * * *